United States Patent [19]

Hirakawa et al.

[11] Patent Number: 5,603,576
[45] Date of Patent: Feb. 18, 1997

[54] METHOD FOR MANUFACTURING BALLS FOR BEARING AND PRODUCTS THEREBY

[75] Inventors: Kiyoshi Hirakawa, Hiratsuka; Akira Suzuki, Kawasaki; Jiami Pu; Katsunori Yanase, both of Tokyo; Minoru Kohari, Ebina; Eiichi Takahashi, Hiratsuka; Yasushi Mutoh, Fujisawa, all of Japan

[73] Assignee: NSK, Ltd., Tokyo, Japan

[21] Appl. No.: 207,030

[22] Filed: Mar. 7, 1994

[30] Foreign Application Priority Data

Mar. 8, 1993 [JP] Japan .................................. 5-070753
Mar. 9, 1993 [JP] Japan .................................. 5-072870

[51] Int. Cl.⁶ ............................................. F16C 33/32
[52] U.S. Cl. ........................... 384/491; 384/492; 384/625
[58] Field of Search ................................ 384/625, 492, 384/912, 913, 565, 569, 491

[56] References Cited

U.S. PATENT DOCUMENTS 4,913,749 4/1990 Hengerer et al. .
5,084,116 1/1992 Mitamura ........................ 384/625
5,122,000 6/1992 Matsumoto et al. ............. 384/625

FOREIGN PATENT DOCUMENTS 1-12812   11/1986  Japan .
1-12813   11/1986  Japan .
4-333521  11/1992  Japan .
314219    6/1929   United Kingdom .
1292723   10/1972  United Kingdom .
2243417   10/1991  United Kingdom .
2250787   6/1992   United Kingdom .

*Primary Examiner*—Lenard A. Footland
*Attorney, Agent, or Firm*—Evenson, McKeown, Edwards & Lenahan P.L.L.C.

[57] ABSTRACT

A method of manufacturing steel balls for use in a ball bearing comprising an inner steel race or shaft with an inner raceway formed around its outer peripheral surface, an outer steel race with an outer raceway formed around its inner peripheral surface, and the steel balls freely rotatably disposed between the inner raceway and the outer raceway comprises the steps of providing steel balls, quenching the steel balls, preliminarily tempering the steel balls after quenched, rough-polishing the steel balls after preliminarily tempered, surface-hardening the steel balls after rough-polished, tempering the steel balls after surface-hardened, and finish-polishing the steel balls after tempered.

2 Claims, 12 Drawing Sheets

METHOD FOR MANUFACTURING BALLS FOR BEARING AND PRODUCTS THEREBY

FIELD OF THE INVENTION

This invention relates to a ball bearing which is used in devices such as a hard disk drive (HDD), video tape recorder (VTR), or digital tape recorder (DAT) to support a spindle that rotates at high speed.

DESCRIPTION OF THE PRIOR ART

The drive motor as shown in FIG. 1 is used in a HDD that is used for example in a computer. This drive motor is used to rotate the spindle 1 at high speed to drive the hard disk. A pair of ball bearings 3 are located between the outer peripheral surface of this spindle 1 and the inner peripheral surface of the housing 2 to support the spindle 1 so that it rotates freely inside the housing 2. Each of the ball bearings 3 comprises an inner steel ring or race 5 which has an inner raceway or track 4 formed around its outer peripheral surface, an outer steel ring or race 7 which has an outer raceway or track 6 formed around its inner peripheral surface, and several steel bearing balls 8 freely rotatably located between the inner raceway or track 4 and the outer race-way or track 6. These bearing balls 8 are preloaded. The existence of the pre-load prevents vibrations and rattles from occurring when the spindle 1 rotates in the ball bearings 3. The inner raceways or tracks 4 may also be formed directly on the outer surface of the spindle 1. In this case the inner ring or races 5 are omitted.

The bearing balls 8 which are used in this kind of conventional ball bearings 3 are manufactured using the process described below.

First, the bearing balls are processed to have a prescribed shape, and then subjected to normal quenching. Next, the bearing balls undergo a prescribed tempering process, and then are roughly polished. Next, a surface hardening process is performed, such as striking the balls against a plate as described for example in Japanese Patent Publication KOKOKU No. H1-12812. After the surface hardening process, these balls undergo a final polishing, and thus they are completed for use as the balls 8 in a ball bearing.

However, when the ball bearings 3 having balls 8 which are manufactured by this conventional process are used to support, for example, a HDD spindle 1, the shape precision of the ball surface gradually or secularly degrades, and due to this, there may also be a degradation of acoustic characteristics in the ball bearings 3.

Before the inventors of this patent application completed this invention, they measured the change in shape precision of the surface of the balls 8 used in a ball bearing 3.

What is meant by the shape precision in this specification is a certain degree of unevenness or undulation in the surface of the balls, which can be expressed in terms of a cumulative or integrated value of unevenness or undulation, specifically differences between the tops and the bottoms of the uneven surface. The shape precision has units µm rms. This value to express the shape precision is made up of a HIGH BAND, which expresses the degree of relatively fine unevenness, and a LOW BAND, which expresses the degree of coarse unevenness. Of these, the HIGH BAND in the shape precision has an effect on the acoustical characteristics. FIG. 2 shows the measured HIGH BAND values of the shape precision.

Also, the Anderon Value is widely known as being a value which has an effect on the acoustical characteristics of the ball bearing 3. This Anderon Value also has a LOW BAND, MEDIUM BAND, and HIGH BAND, which are determined according to frequency. FIG. 3(A) shows the measured values of the MEDIUM BAND, and FIG. 3 (B) shows the measured values of the HIGH BAND. In order to measure the gradual or secular change of the shape precision and Anderon Value, the inventors rotated the ball bearing 3 while leaving the balls 8 under no load (causing gradual or secular change). The reason for doing this was to remove the effects of the pre-load etc. applied to the balls 8.

The shape precision of the conventional balls 8, as can be clearly seen from FIG. 2, gradually or secularly degrades, and then stabilizes after a certain amount of degradation. Also, the Anderon Value of the ball bearing 3 with these balls 8 incorporated in it, gradually or secularly degrades, and then stabilizes after a certain amount of degradation.

Also, when the ball bearings 3, which have conventional balls 8 manufactured as described above, are used to support the spindle 1 of a HDD etc., there is a degradation of the acoustical characteristics in just a relatively short period of time. Specifically, this is noticed in a performance test which is performed on all of the HDD etc. manufactured. This performance test is referred to as "burn-in" and performed on the assembled HDD with ball bearings 3, by placing it into a tester such as an environment-proof tester called a "pressure cooker".

In this performance test, the ball bearings 3 are pre-loaded and left in a stationary state at a relatively high temperature of 55° C. to 80 ° C., for 5 hours or longer (eg. at 80° C. for 5 hours). Often a degradation in the acoustical characteristics of the ball bearings 3 is observed after the performance test when compared to before the test. This degradation in acoustical characteristics undesirably worsens the performance of a HDD or VTR.

The inventors of this invention studied the cause of the degradation through the performance test of the acoustical characteristics of the ball bearings 3 having a diameter of 2.000 mm, and has determined that it is caused by pressure marks or indentations which are formed during the performance test in the area of the rolling surface of the balls 8 which comes in contact with the inner raceway or track 4 or outer raceway or track 6.

The inventors of the present invention, before confirming the existence of these pressure marks or indentations, used a device as shown in FIG. 4 to analyze the frequency of the absolute value of the acoustical detection signal. This device of FIG. 4 comprises a table 10 which is hung from lines or strings 9, so that no external vibrations are transmitted to the table 10. When the inventors performed the experiment, the motor 11 for the HDD with the ball bearings 3 incorporated in its was placed on the table 10, and it was hooked up to electricity, so that it rotated the spindle 1 (look at FIG. 1). The inventors used a microphone 12 to detect the acoustic sound which occurred when the spindle 1 rotated, and this detected signal was fed through a noise meter 13, signal converter 14, and bearing monitor 15, then sent to a frequency analyzer 16, so that the frequency of the acoustic sound was analyzed. The signal converter 14 is used to convert the acoustic signal to a signal that is identical to the acceleration pick-up. Using the signal converter 14 and the bearing monitor 15 which was sold by NSK Ltd., the inventors analyzed the frequency with envelope analysis conducting the fast Fourier transforms (FFT).

FIG. 5(A) and FIG. 5(B) show the results of the frequency analysis which was performed on the motor 11 in the above manner. Of these results, FIG. 5(A) shows the results of the frequency analysis of the acoustic sound before the performance test, and FIG. 5(B) shows the results of the frequency analysis of the acoustic sound after the performance test (the ball bearing was left for 48 hours at 70° C.). The circled portions correspond to each other in these graphs and indicate a peak value of the acoustical characteristic. It can be confirmed from the results of the frequency analysis of the absolute value detection signal that a specific cycle and peak value of its harmonics appear after the performance test was performed. It was also found that this specific cycle is substantially equal to the cycle at which the balls 8 revolve on its own center. This peak value of the acoustic sound, which matches revolving cycle of the balls 8, does not appear in the motor 11 before the performance test was performed, as can be clearly seen in FIG. 5(A).

Next, after the aforementioned performance test, the inventors used a precision surface roughness detector to measure the roughness of the balls 8 around their circumference, including the area where they contact the raceways or tracks of the bearing rings or races. These results are shown in FIG. 6. The circled portions X and Y in FIG. 6 are where the pressure marks or indentations of about 0.05 μm deep were formed when the balls came in contact with the inner raceway or track 4 or outer raceway or track 6 during the performance test. The pressure marks or indentations are clearly indented in comparison with the remainder of the surface.

Incidentally, a process for hardening the surface of balls by striking them against a plate was described in the Japanese Patent Publication KOKOKU No. H1-12812. In addition, as disclosed in Japanese Patent Publication KOKAI No. H4-333521, treating the surface of a bearing ring after machined by quenching, rough polishing, shot peening, tempering, and finish-polishing in series has also been well known in the art related to treating the surface of ball-bearing parts.

However, the objective of the prior art disclosed in Japanese Patent Publication KOKOKU No. H1-12812, is to lengthen the rolling life of the bearing balls and to prevent the rolling surface of the bearing balls from being damaged. It does not take into consideration the prevention of gradual or secular degradation of the shape precision of the bearing balls. Accordingly, depending on the manner of use, there is a possibility that the ball bearings which use the balls manufactured by this prior art technology may have a gradual or secular degradation of acoustical characteristics. In addition, this prior art technology is not intended for preventing degradation of acoustical characteristics due to performance tests as mentioned above, and depending on the conditions, is often unable to satisfactorily prevent this kind of degradation.

Further, the objective of the prior art technology disclosed in Japanese Patent Publication KOKAI No. H4-333521 is to improve the wear resistance and fatigue life of the bearing ring or race, and of course it is not able to prevent gradual or secular degradation of the shape precision of the ball surface. Also, from the prior art technology disclosed in Japanese Patent Publication KOKAI No. H4-333521, it can not expect that pressure marks or indentations may be formed on the surface of the balls due to performance tests. Thus, it can not prevent pressure marks or indentations from being formed on the bearing balls due to performance test as mentioned above, and is unable to prevent the degradation of acoustical characteristics of the bearing which is caused by the pressure marks or indentations formed on the balls by the performance tests.

Improving the shape precision of the bearing ring or race is necessary for preventing the degradation of the acoustical characteristics of ball bearings during rotation. However, improving the shape precision of the balls is even more important than improving the shape precision of the bearing ring or race. The importance of improving the shape precision of the balls has been know in the art for a long time, and was reported in the SKF report no. AL61L032 in October 1961.

SUMMARY OF THE INVENTION

The inventors took the aforementioned problems into consideration when inventing a process for processing the surface of the balls.

An objective of this invention is to improve the surface treatment process of bearing balls to prevent gradual or secular degradation of the shape precision of the bearing balls, reduce the degree of gradual or secular degradation of the acoustical characteristics of a ball bearing using the balls, and prevent degradation of the acoustical characteristics due to the performance test.

Another objective of this invention is to perform a tempering process after the surface hardening process of the bearing balls, so as to prevent gradual or secular degradation of the shape precision of the surface of the balls and to prevent pressure marks or indentation from being formed on the bearing balls during performance testing, resulting in that gradual or secular degradation of the acoustical characteristics of the ball bearing is prevented.

DESCRIPTION OF THE PREFERRED EMBODIMENTS

In order to confirm the results of this invention, the process described below was used to manufacture the bearing balls according to an embodiment of this invention.

First, bearing balls were processed to a prescribed shape and size, and normal quenching was performed on the surface of the bearing balls. Then, the preliminary tempering process was performed on the surface of the balls for 120 minutes at 125° C. Following this, rough polishing was performed on the balls, and then the surface hardening process using the method described in the Japanese Patent Publication KOKOKU No. H1-12812 was performed. After this surface hardening process, the tempering process for 120 minutes at 160 ° C. was performed, after which the finish polishing was performed to complete balls for the ball-bearing.

The same process was applied to the bearing balls having a diameter of 1.588 mm, 2.000 mm or 2.778 mm.

Figure 1:
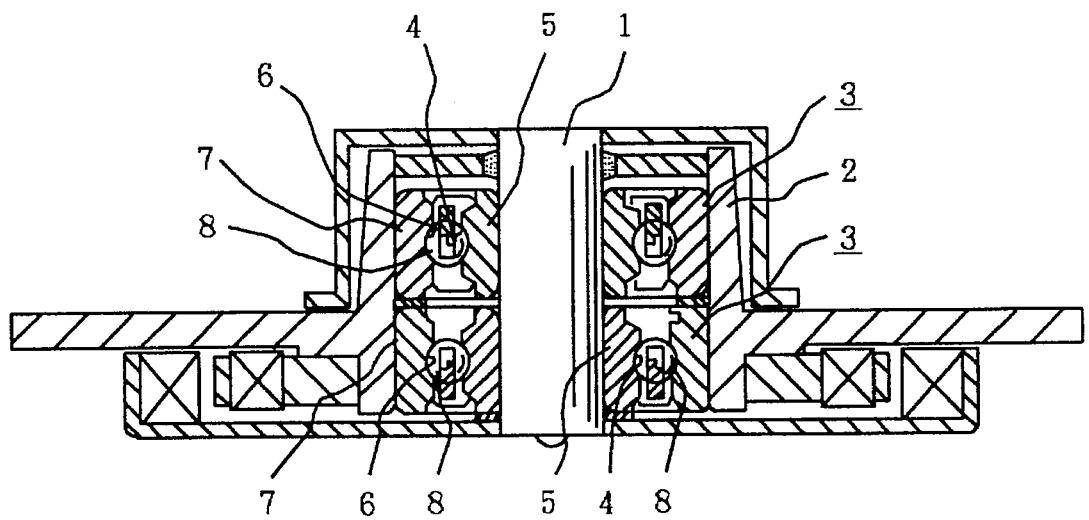
FIG. 1 is a cross-sectional view of the drive motor for a hard disk drive (HDD) which uses ball bearings to be improved by this invention.
Figure 2:
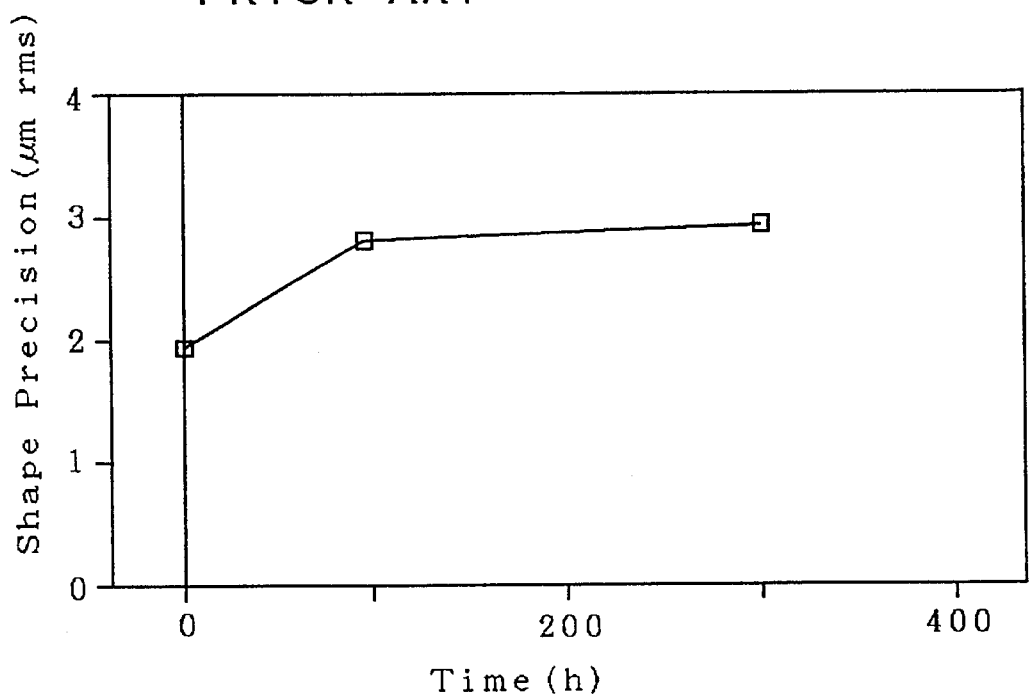
FIG. 2 is a graph showing the gradual or secular change of the shape precision of the surface of conventional balls for the ball bearing.
Figure 3A:
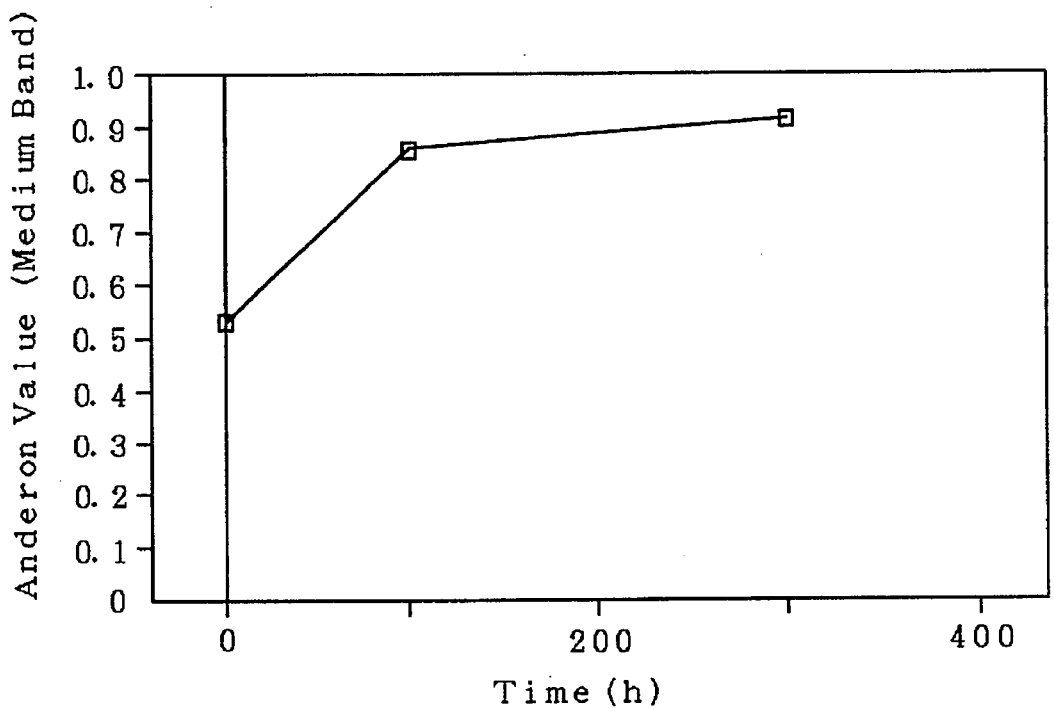
FIG. 3(A) is a graph showing the gradual or secular change of the Anderon Value of conventional bearing balls, specifically showing the measured values of the MEDIUM BAND.
Figure 3B:
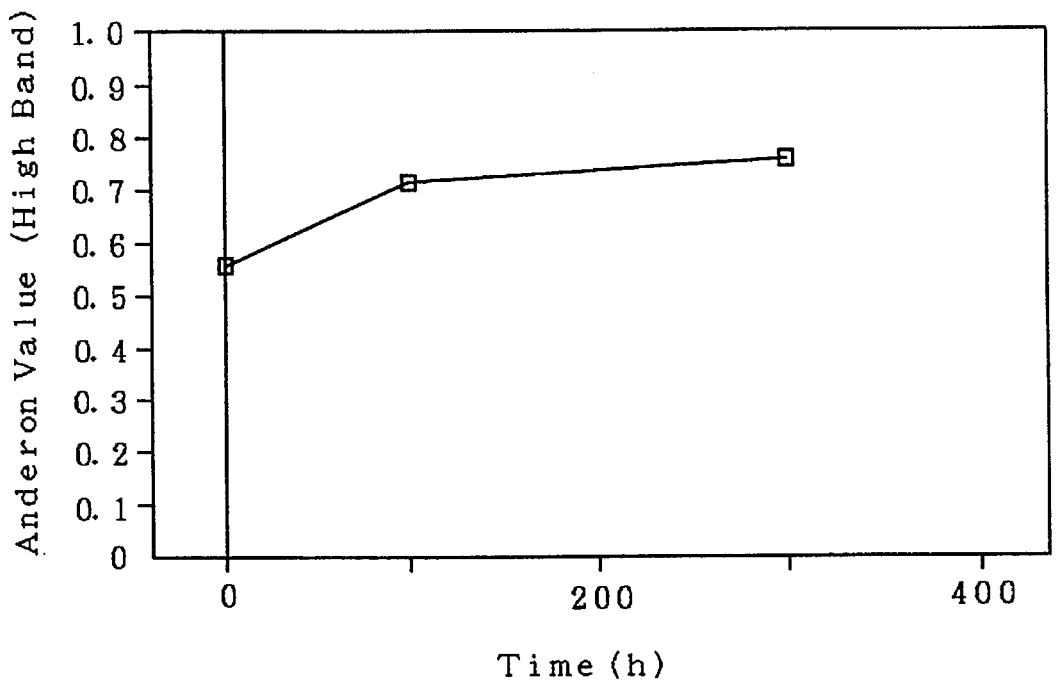
FIG. 3(B) is a graph showing the gradual or secular change of the Anderon Value of conventional balls, specifically showing the measured values of the HIGH BAND.
Figure 4:
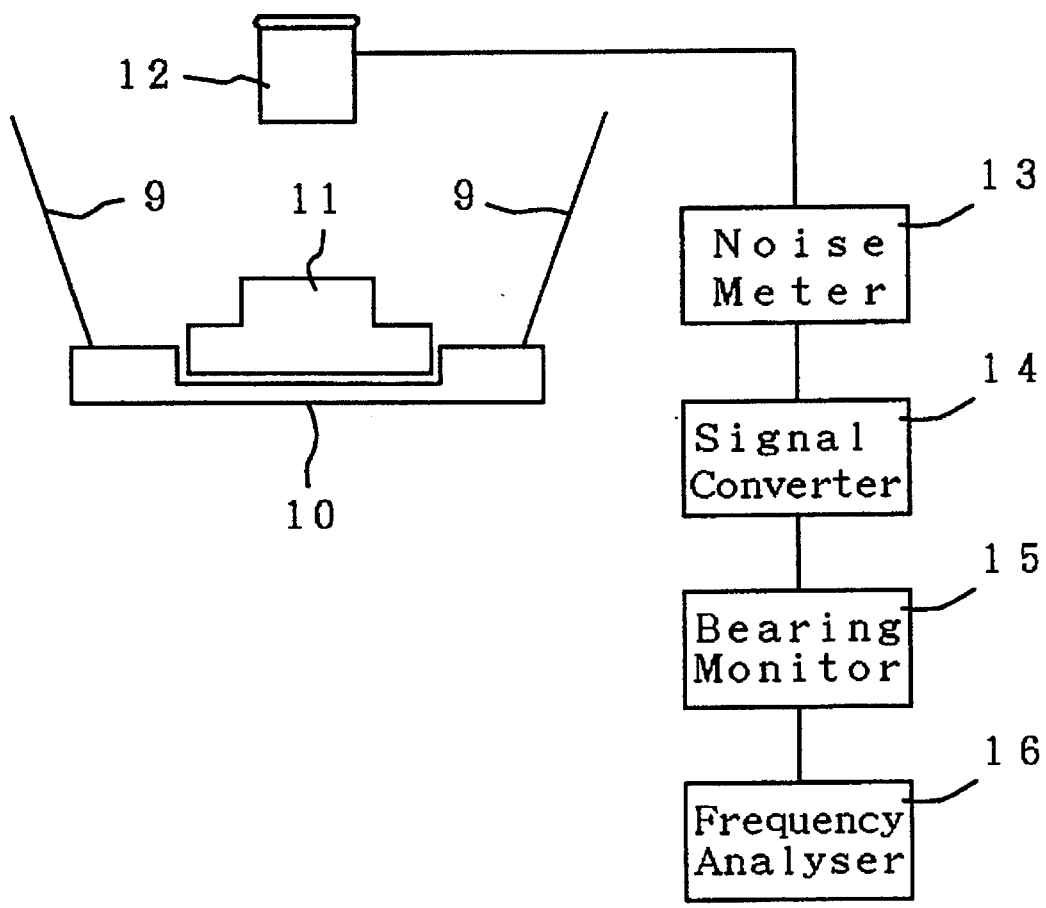
FIG. 4 is a block diagram of the devices used in measuring the acoustical characteristics of the ball bearing.

These balls of each size manufactured according to the process of this invention were installed into a ball bearing 3 for use in a HDD as shown in FIG. 1. Using the same measurement technique as described above for the conventional bearing balls, the inventors measured the change in the shape precision of the surface of the bearing balls, and measured the change in Anderon Value for the ball bearing using these bearing balls.

Figure 7:
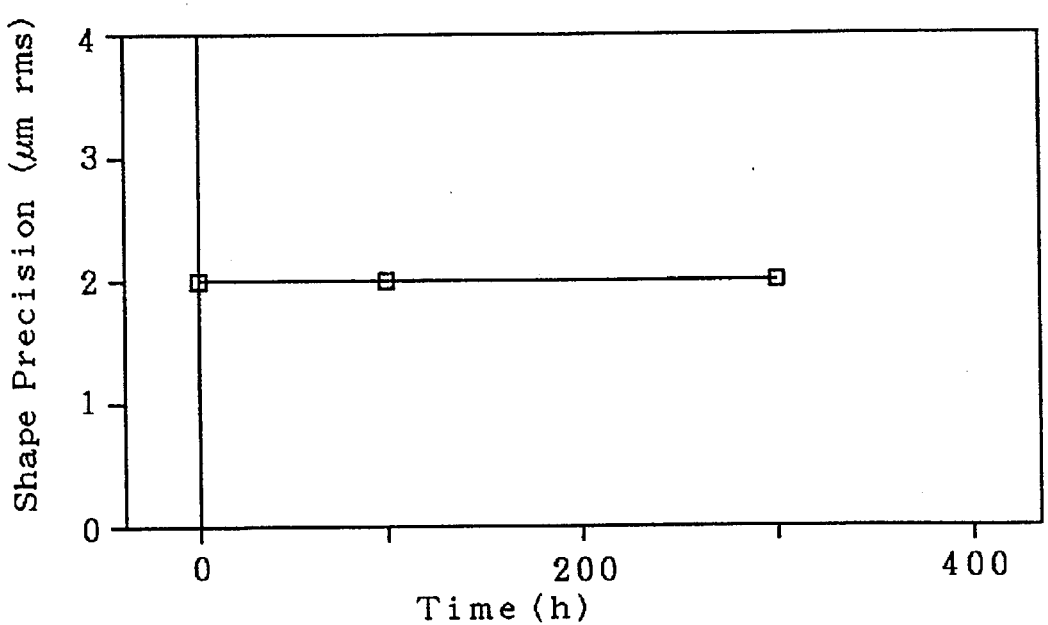
FIG. 7 is a graph showing the gradual or secular change of the shape precision of the surface of the ball processed according to this invention.
Figure 8A:
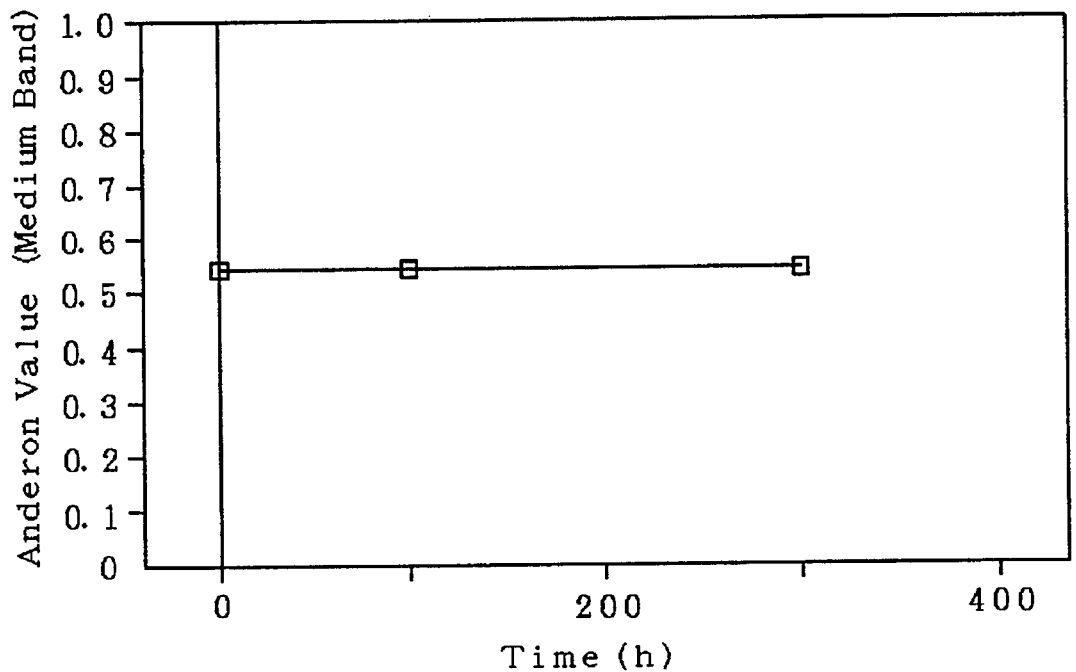
FIG. 8(A) is a graph showing the gradual or secular change of the Anderon Value of the ball processed according to this invention, specifically showing the measured values of the MEDIUM BAND.
Figure 8B:
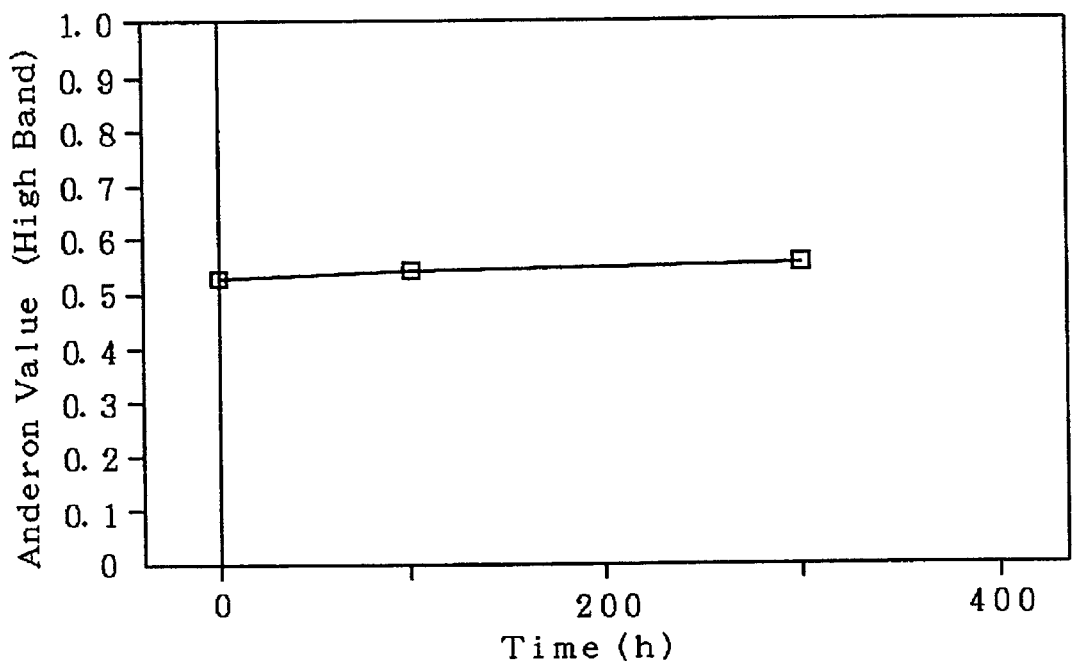
FIG. 8(B) is a graph showing the gradual or secular change of the Anderon Value of the ball processed according to this invention, specifically showing the measured values of the HIGH BAND.

The following are the results of measurement in the bearing balls of 2.000 mm in diameter. FIG. 7 shows the measurement results of the shape precision (HIGH BAND), and FIG. 8(A) and FIG. 8(B) show the measurement results of the Anderon Value. FIG. 8(A) shows the measured values of the Anderon Value of the MEDIUM BAND, and FIG. 8(B) shows the measured values of the HIGH BAND.

The bearing balls of having 1.588 mm and 2.778 mm in diameter exhibited substantially the same measurement results, respectively.

As can be clearly seen from FIG. 7 and FIGS. 8(A) and 8 (B), there is hardly any gradual or secular degradation of the shape precision on the surface of the bearing balls produced according to this invention. Therefore, there is hardly any degradation of acoustical characteristics of the ball bearing in which these balls are incorporated. The reason for this is that by performing the tempering process after the surface hardening process, the residual stresses that occurred in the ball due to the surface hardening process have been removed. On the contrary, in the conventional balls, where the balls are completed by performing the finish polishing immediately after the surface hardening process, it is expected that the residual stresses remain in the balls, which may cause gradual or secular degradation of the shape precision of the ball surface.

To get the most effect from this invention, it is best if the shape precision of the ball surface is kept within 3 μm rms. The reason for this is that the gradual or secular degradation of the shape precision is outstanding on the high shape precision, and bearing balls with poor shape precision (more than 3 μm rms) do not have such problems inherently with reference to the shape precision. In other words, acoustical characteristics of the ball bearing using such balls are inherently too poor to make the application of this invention effective.

Bearing balls for comparison of the same sizes as mentioned above were manufactured so that they inherently had poor shape precision, using the same process as used for conventional balls; quenching, tempering, rough polishing, surface hardening, and finish polishing, and then these balls were installed in the ball bearings 3 used in a HDD. The same measuring technique was used as for the bearing balls produced according to this invention to measure the change in the shape precision of the bearing balls for comparison and to measure the change of the Anderon Value of the ball bearings using these bearing balls for comparison.

Figure 9:
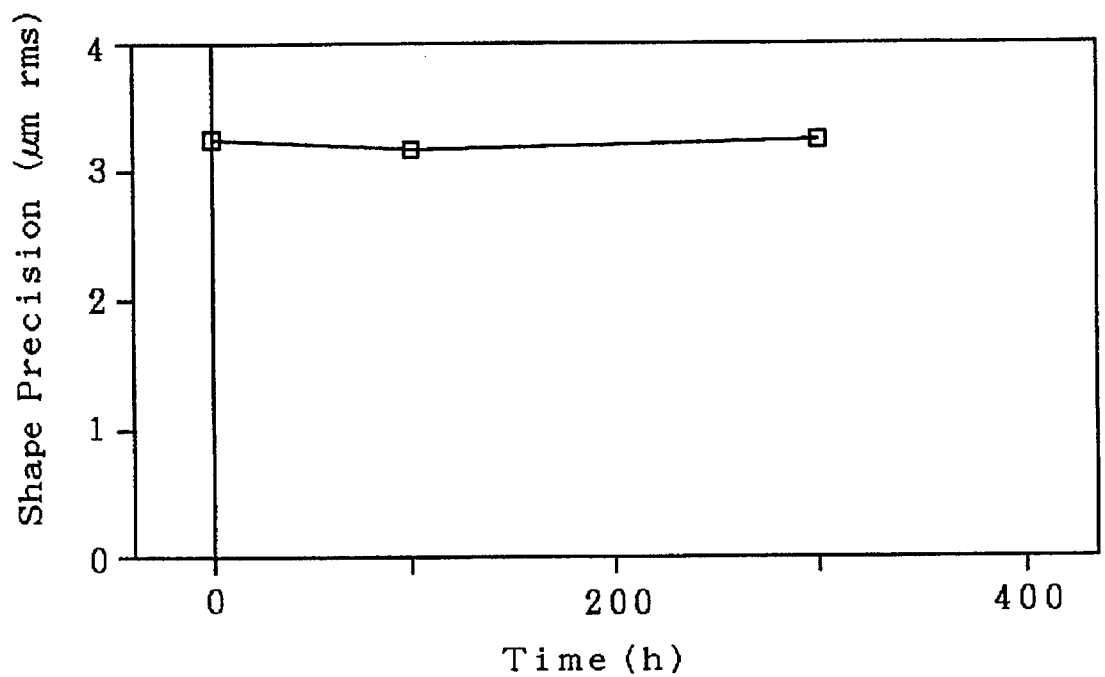
FIG. 9 is a graph showing the gradual or secular change of shape precision of the surface of ball that is provided for a comparison.
Figure 10:
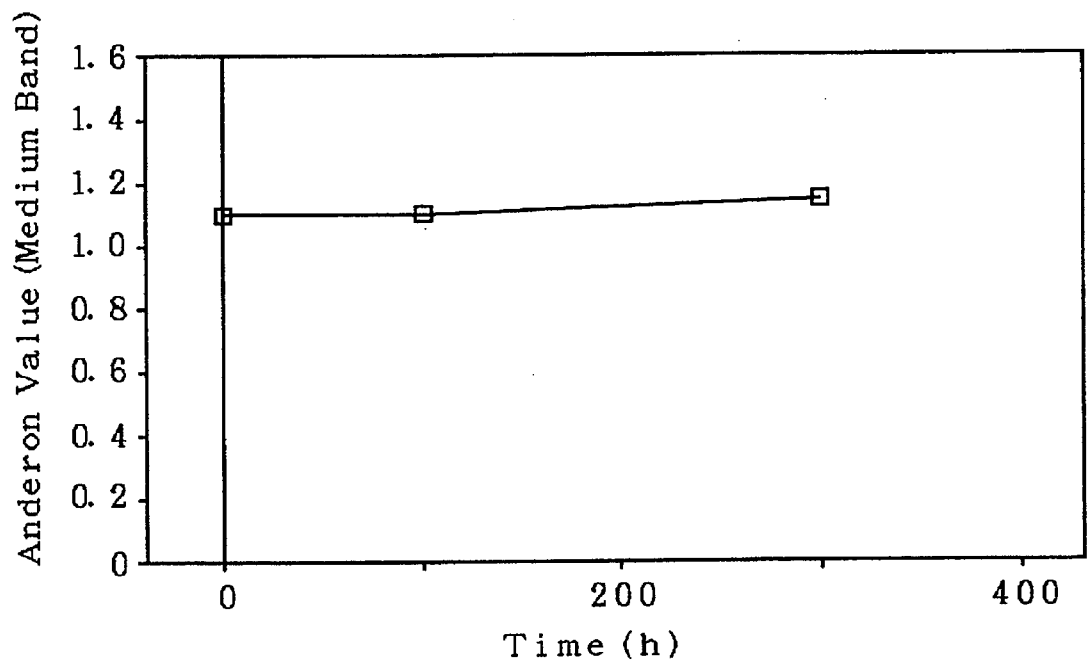
FIG. 10(A) is a graph showing the gradual or secular change of the Anderon Value of the ball provided for comparison, specifically showing the measured values of the MEDIUM BAND.
FIG. 10(B) is a graph showing the gradual or secular change of the Anderon Value of he ball provided for comparison, specifically showing the measured values of the HIGH BAND.
Figure 10:
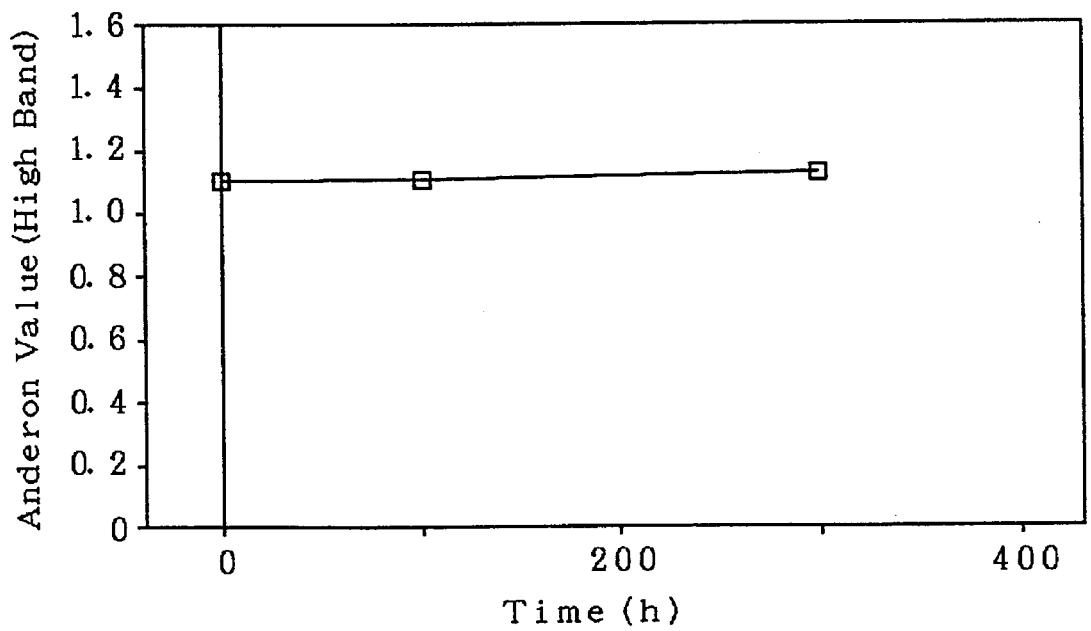

The following are the measurement results of the bearing balls of 2.000 mm in diameter. FIG. 9 shows the measured values of the shape precision (HIGH BAND), and FIG. 10(A) and FIG. 10 (B) show the measured values of the Anderon Value. FIG. 10(A) shows the measured Anderon Values of the MEDIUM BAND, and FIG. 10 (B) shows the measured values of the HIGH BAND.

The bearing balls with the other sizes in diameter exhibited substantially the same measurement results, respectively.

As can be clearly seen from FIG. 9 and FIGS. 10(A) and 10 (B), there was hardly any gradual or secular degradation of the shape precision of the balls for comparison, and there was also almost no gradual or secular degradation of the acoustical characteristics of the ball bearings using these bearing balls for comparison. On the other hand, the original shape precision and acoustical characteristics related to these bearing balls for comparison, were about the same as the values after gradual or secular degradation of the conventional bearing balls and of the ball bearing using these balls. The conventional ones had good original shape precision and acoustical characteristics, but changed. When the inventors of the present invention measured the shape precision of these bearing balls for comparison, it was about 3 μm rms. Accordingly, it is desirable for this invention to be most effective, if the shape precision of the balls is kept below 3 μm rms.

Figure 5A:
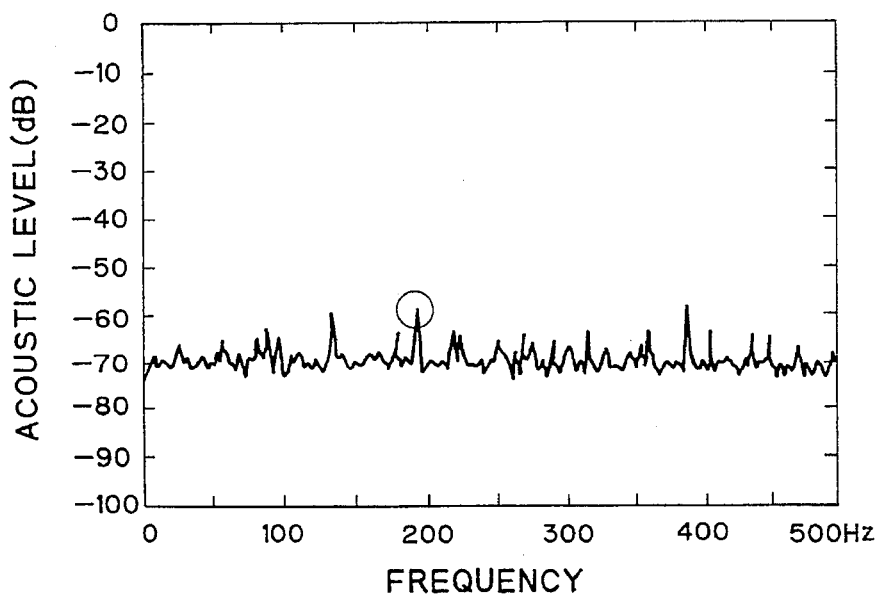
FIG. 5(A) and FIG. 5(B) are graphs showing the acoustical characteristics, before and after the performance test, of a ball bearing which uses conventional balls.
Figure 5B:
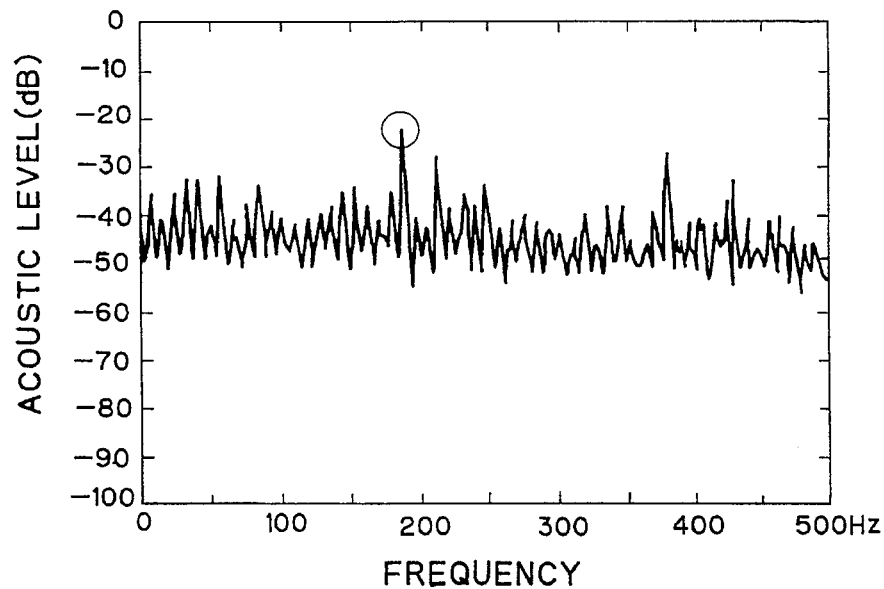
Figure 11A:
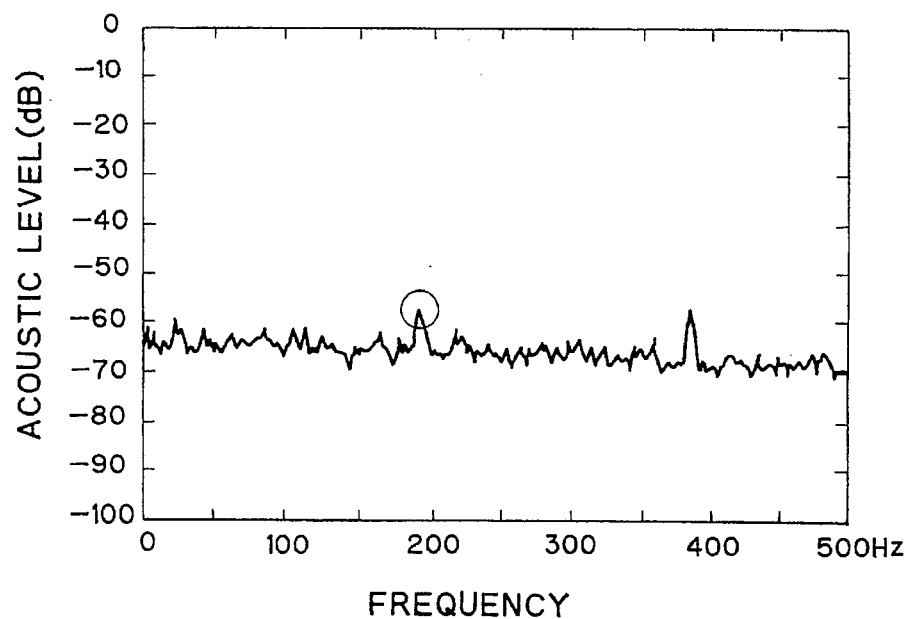
FIG. 11(A) and FIG. 11(B) are graphs showing the acoustical characteristics, before and after the performance test, of the ball bearing produced according to this invention.
Figure 11B:
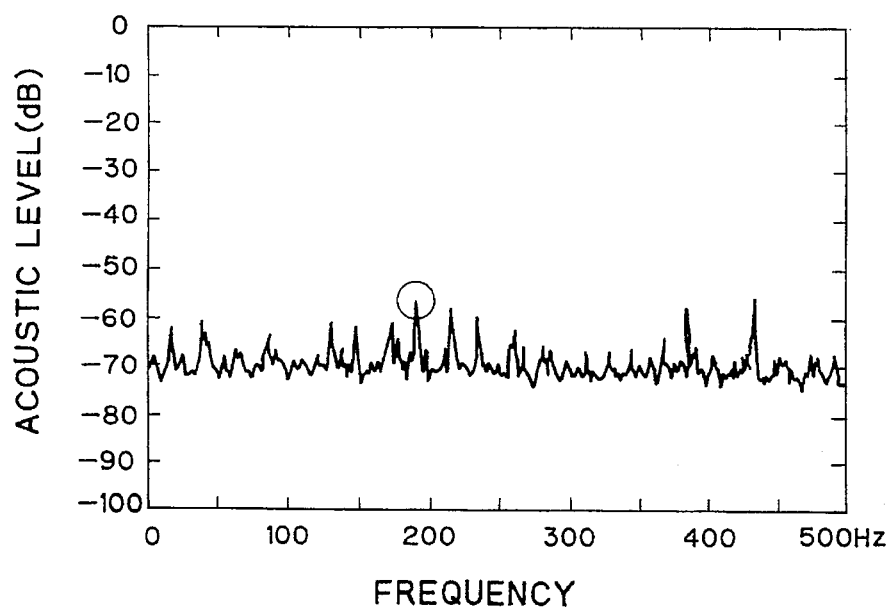

A performance test as was described above, was also performed on the ball bearings 3 for a HDD as shown in FIG. 1, in which the bearing balls manufactured according to the invention were installed. FIG. 11(A) shows the acoustical characteristics of the ball bearings 3 with 2 mm balls before the performance test, and FIG. 11(B) shows the acoustical characteristic after the performance test was finished. The circled portions correspond to each other in these graphs and indicate a peak value of the acoustical characteristic. The fact that this invention is effective to prevent gradual or secular degradation due to the performance test of the acoustical characteristics can be seen by comparing FIGS. 11(A) and(B) with FIGS. 5(A) and (B) which shows the acoustical characteristics of conventional ball bearings.

Figure 6:
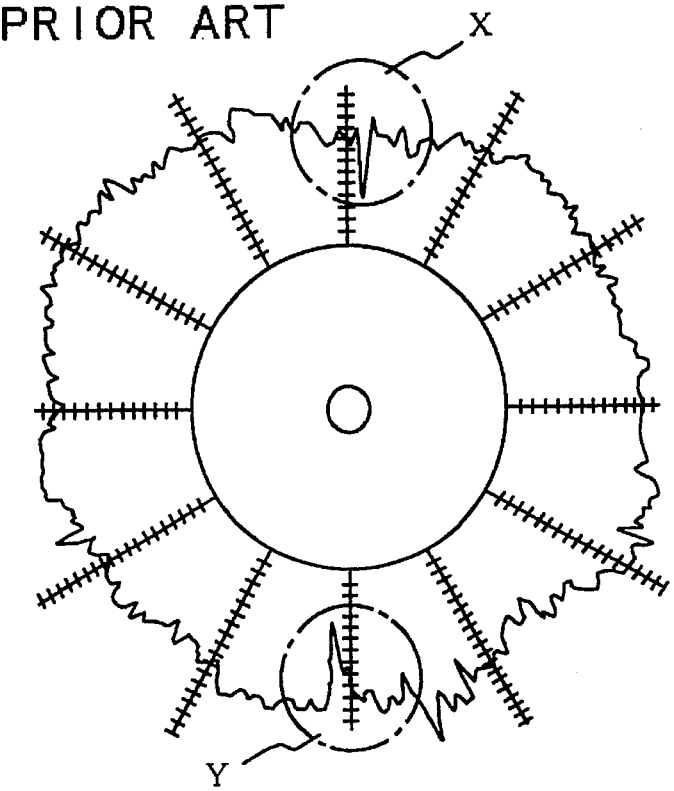
FIG. 6 is a graph showing the shape of the surface of conventional balls after the performance test.
Figure 12:
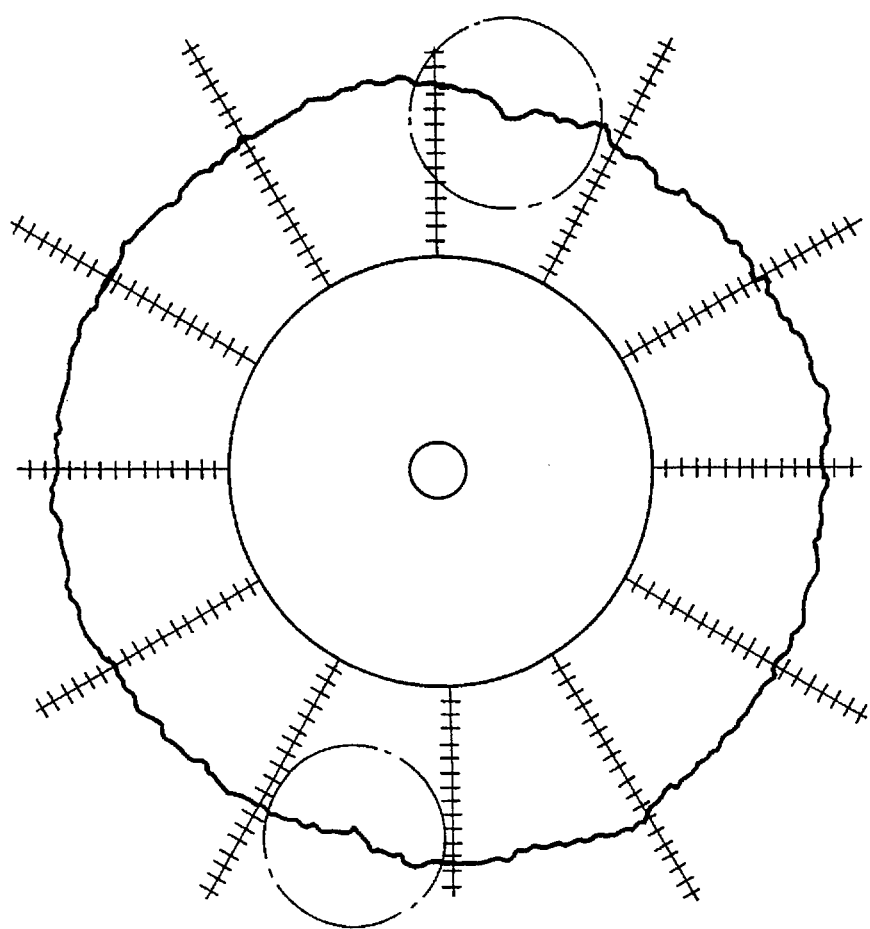
FIG. 12 is a graph showing the shape of the surface of the ball according to this invention after the performance test.

Also, after the aforementioned performance test, the inventors used a surface roughness meter to measure the surface roughness of the balls according to this invention around the circumference of the balls including the areas where they came in direct contact with the raceway or track of the bearing ring. FIG. 12 shows the measured results of the bearing balls having a diameter of 2.000 mm. The areas in FIG. 12 that are circled indicate pressure marks or indentations that were formed by direct contact with the inner raceway or track 4 or outer raceway or track 6 during the performance test. As can be seen from FIG. 12 to be compared with FIG. 6 which shows measured results for the conventional balls, the pressure marks or indentations in FIG. 12 are not as deep as the pressure marks or indentations on the conventional balls in FIG. 6.

Figure 13:
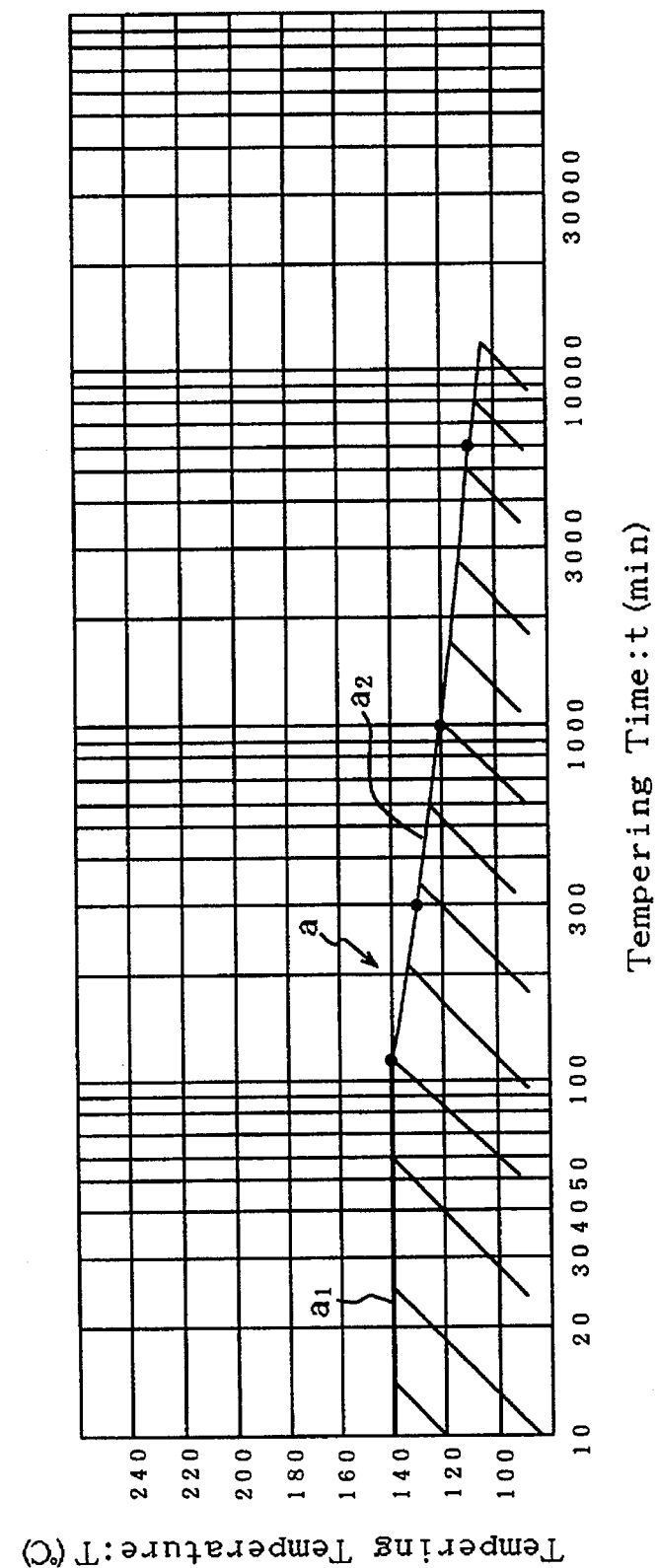
FIG. 13 is a graph showing the temperature and time conditions for the preliminary tempering process.

Next, FIG. 13 shows the relationship in this embodiment of the invention between the tempering time "t" and the uppermost values of the tempering temperature "T" during the preliminary tempering process that is performed after the quenching process and before the rough polishing process. In FIG. 13, the tempering temperature "T" is shown along the vertical axis or ordinate, and the tempering time "t" is shown using a logarithmic scale along the horizontal axis or abscissa.

The solid line a in FIG. 13 indicates the uppermost values of the tempering temperature. Straight Sectional of the line a indicates a constant temperature of 140 ° C. when the tempering time is between 10 and 120 minutes, and Curved Section a2 of the line a indicates a gradual decrease of the uppermost value of the tempering temperature "T" as the tempering time "t" increases beyond 120 minutes. This Section a2 starts at 140 ° C. and 120 minutes, and passes through the points; 130° C. and 300 minutes, 120° C. and 1000 minutes, and 110° C. and 6000 minutes.

The preliminary tempering process is desirable when performed in the range shown by hatching in FIG. 13 under the solid line a. If the temperature of the preliminary tempering exceeds the uppermost value shown in FIG. 13, the surface hardness of the balls is too low after the surface hardening and tempering processes have been performed. When the surface hardness of the balls is too low, it is very easy for the balls to be scratched and damaged, and this is not a desirable condition.

Incidentally, it should be noted that the preliminary tempering can be conducted at a temperature higher than the uppermost value in FIG. 13 on bearing balls if the bearing balls are incorporated in the bearing for high temperature use.

This preliminary tempering process is performed in order to prevent defects such as cracks from occurring on the surface of the balls during the rough polishing, and surface hardening processes that follow the preliminary tempering process. However, this preliminary tempering process is not absolutely necessary for preventing the degradation of the acoustical characteristics due to the performance test. This preliminary tempering process can be omitted if another method is used for preventing the aforementioned defects.

Figure 14:
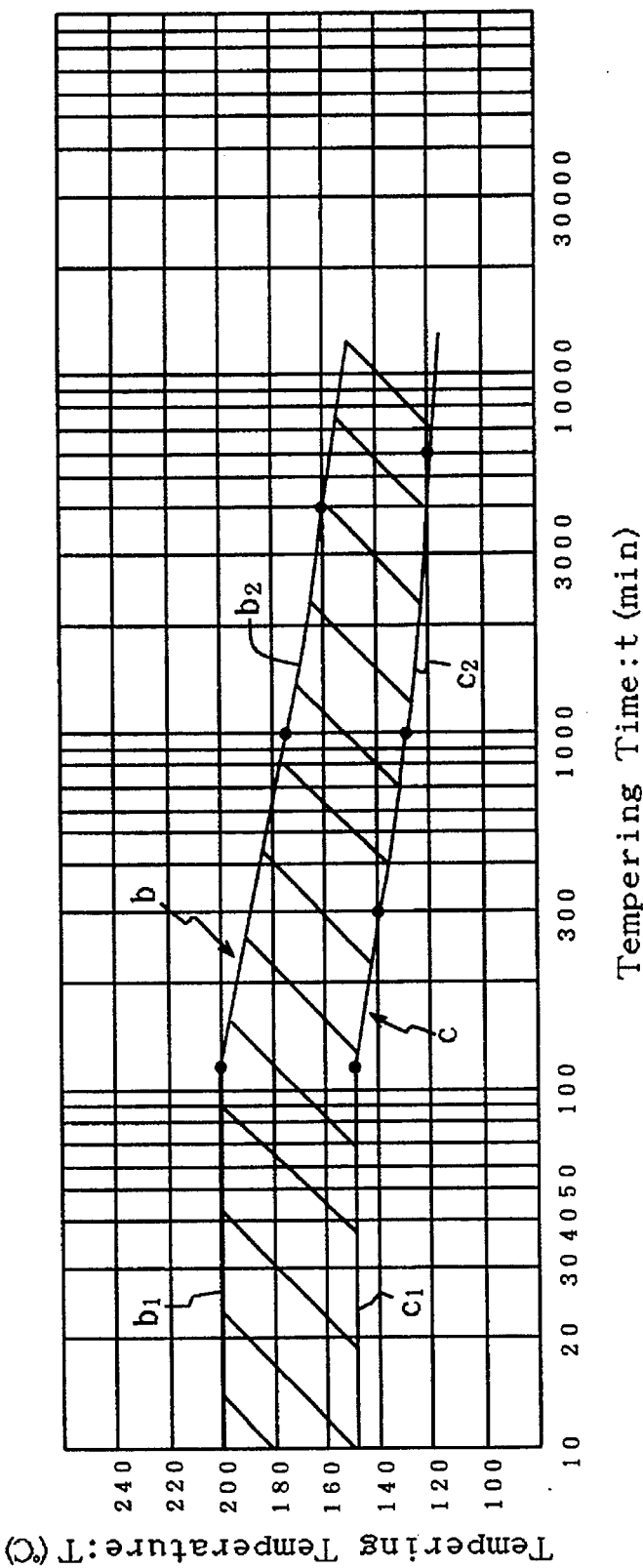
FIG. 14 is a graph showing the relationship between the temperature and time of the tempering process performed after the surface hardening process.

Next, FIG. 14 shows the relationship in this embodiment of the invention between the tempering time "t" and the uppermost and lowermost values of tempering temperature "T" in the tempering process which is performed after the surface hardening process and before the final polishing process. In FIG. 14, the tempering temperature "T" is shown along the vertical axis or ordinate, and the tempering time "t" is shown using a logarithmic scale along the horizontal axis or abscissa.

The solid line b in FIG. 14 shows the relationship between the uppermost value of the tempering temperature "T" and the tempering time "t". Straight Section b1 of the line b indicates a constant temperature of 200° C. when the tempering time is between 10 and 120° C. minutes, and Curved Section b2 of the line indicates a gradual decrease of the uppermost value of the tempering temperature "T" as the tempering time "t" increases beyond 120 minutes. This Section b2 of the curve b starts at 200° C. and 120 minutes, and passes through the points; 175° C. and 1000 minutes, and 160° C. and 4000 minutes.

Also, the solid line c, in FIG. 14 shows the relationship between the lowermost value of the tempering temperature "T" and the tempering time "t". Straight Section c1 of the line c indicates a constant temperature of 150° C. when the tempering time is between 10 and 120 minutes, and Curved Section c2 of the line c indicates a gradual decrease of the lowermost value of the tempering temperature "T" as the tempering time "t" increases beyond 120 minutes. This section c2 of the curve c starts at 150° C. and 120 minutes, and passes through the points; 140° C. and 300 minutes, 130° C. and 1000 minutes, and 120° C. and 6000 minutes.

The tempering process after the aforementioned surface hardening process is desirable when performed in the range shown by hatching in FIG. 14 between solid lines b and c. When the tempering temperature exceeds the uppermost values given in FIG. 14, the surface hardness of the balls is too low, so that it is very easy for the surface to be scratched or damaged, which is undesirable. Also, if the tempering temperature is below the lowermost values, the residual stresses inside the balls, which occur during the surface hardening process, are not completely removed, making it impossible to effectively prevent the degradation of the acoustical characteristics.

The description above is made for the bearing balls having a diameter of 2.000 mm, and substantially the same results are obtained in the bearing balls of 1.588 mm and 2.778 mm in diameter.

In the balls manufactured according to this invention, there is hardly any gradual or secular degradation of the shape precision of the ball surface, and if there is any degradation it is very minor. Also, there is hardly any degradation of the acoustical characteristics due to the performance test in the ball bearing having the balls manufactured according to the present invention, and if there is any degradation it is very minor. Therefore, this invention improves the performance of a HDD or VTR which uses ball bearings with these balls according to the present invention.

It will be apparent to those skilled in the art that the bearing balls manufactured according to the present invention and the bearing having the bearing balls are covered by the present invention, and that various modifications and variations are possible in this invention without departing from the spirit or scope of this invention.

What is claimed is:

1. Steel balls for a ball-bearing produced through subjecting the balls to a preliminary tempering process, then to a rough polishing process, then to a surface hardening process and a tempering process performed after the surface hardening process and before a final polishing process, so as to be incorporated in a ball bearing comprising an inner steel race or shaft with an inner raceway formed around its peripheral outer surface, an outer steel race with an outer raceway formed around its inner peripheral surface, and the steel balls freely rotatably disposed between said inner raceway and outer raceway.

2. The steel balls of claim 1 having a maximum high band surface shape precision of up to 3 µm rms.

* * * * *